(No Model.)
D. WHITLOCK.
PEGGING JACK.
No. 483,191. Patented Sept. 27, 1892.
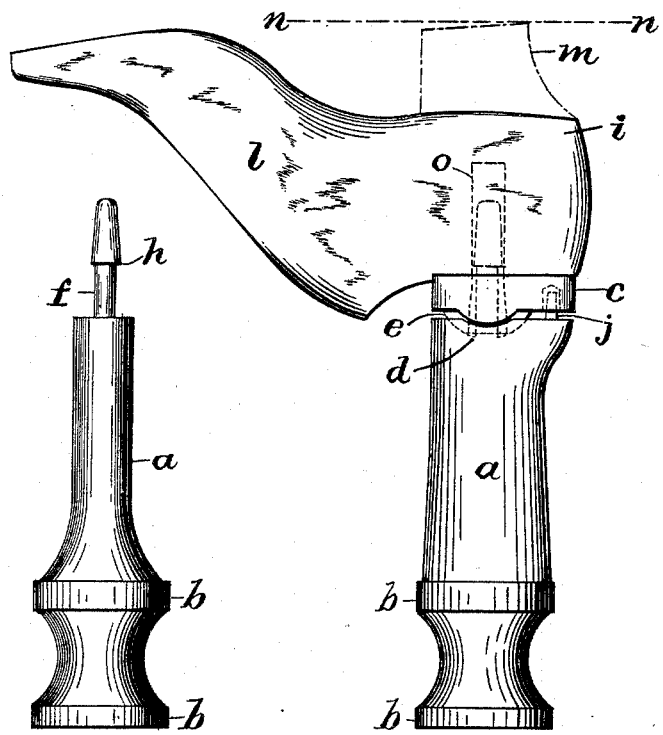
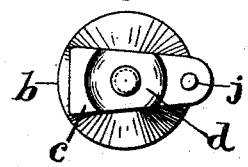
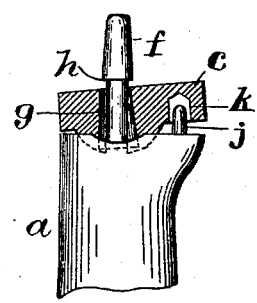
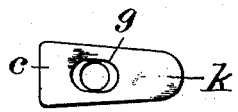
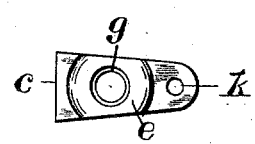
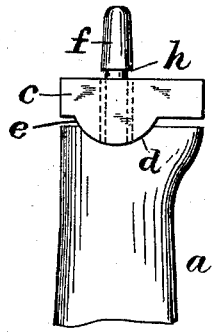
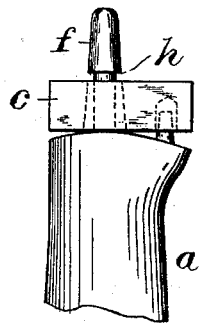
Attest:
J. Van Nest Jr.
L. Lee.
Inventor.
Daniel Whitlock, per
Crane & Miller, attys.

UNITED STATES PATENT OFFICE.

DANIEL WHITLOCK, OF NEWARK, NEW JERSEY.

PEGGING-JACK.

SPECIFICATION forming part of Letters Patent No. 483,191, dated September 27, 1892.

Application filed December 18, 1891. Serial No. 415,561. (No model.)

*To all whom it may concern:*

Be it known that I, DANIEL WHITLOCK, a citizen of the United States, residing at Newark, Essex county, New Jersey, have invented certain new and useful Improvements in Shoe-Heeling Jacks, fully described and represented in the following specification and the accompanying drawings, forming a part of the same.

The object of this invention is, first, to furnish a self adjusting or compensating bearing for the last during the heeling operation, and, secondly, to furnish a jack with a series of interchangeable bearings, by which a bearing may always be provided to fit the entire under side of the "last-head" adjacent to the "comb."

In the annexed drawings, Figure 1 is a side elevation of a jack constructed with my improved bearing sustaining a last. Fig. 2 is a rear view of the jack post or standard with the bearing removed. Fig. 3 is a side view of the jack with the adjustable bearing shown in section inclined from the position shown in Fig. 1. Fig. 4 is a plan of the post or standard of the jack. Fig. 5 shows the under side of the adjustable bearing. The bearing and jack-post in Figs. 1 to 5 are constructed with a spherical joint between the post and bearing. Fig. 6 shows the head of the post with the bearing fitted thereto by a transverse cylindrical joint. Fig. 7 is a plan of the bearing-block shown in Fig. 8, which is provided with a cylindrical surface in contact with a flat surface. Figs. 9 and 10 are views like Fig. 5 of two bearing-blocks of different lengths.

$a$ is the post of the jack, provided at the bottom with collar $b$, by which it is commonly grasped and held in a heeling-machine. The post may be made of any form adapted for use in heeling shoes by hand or by machine.

$c$ is a bearing or block interposed between the head of the post and the head of the last $l$, (lettered $l'$ in Fig. 1,) the bearing being fitted movably to the head of the post, so as to permit the last to tip in a slight degree, if required, during the heeling operation. The bearing-block may be rounded in any convenient manner to make it rock or tip automatically upon the head of the post $a$, a spherical socket $d$ being shown in the head of the post in Figs. 1, 3, and 4 and a spherical projection or seat $e$ being provided upon the under side of the bearing to fit such socket. The jack is provided with a pin $f$, fixed rigidly in the top of the same, and fitted to a hole $o$ in the last to hold the head of the last on the jack, and the bearing $c$ is provided with a hole to fit over such pin, which retains the bearing-block $g$ in place. The upper end of the pin $f$ is preferably formed with a shoulder $h$ to catch the upper side of the block $c$, and thus prevent the accidental lifting of the bearing-block from the jack with the shoe. The heel $i$ of the last is ordinarily first lifted from the jack by the workman, which tends to tip the bearing-block over into the position shown in Fig. 3 by the rubbing of the ankle-leather of the shoe against the rear end of the bearing-block. The hole $g$ is made at the top of the same size as the shoulder $h$, and the block therefore catches under the shoulder when it is tipped, as is clearly shown at the right-hand side of the pin $f$ in Fig. 3.

In a heeling-machine the nailing devices press toward the top of the jack and are constructed upon their under side to fit a level surface. Where the surface of the heel varies from a level line, (indicated by the dot-and-dash line $n\, n$ in Fig. 1,) one edge of the heel is pressed more forcibly by the nailing devices, and where the bearing of the last is rigid the pressure upon a part of the bearing is greatly increased, and the wood in the head $l'$ of the last is indented and bruised. With the yielding bearing shown herein any unequal pressure upon the surface of the heel operates to tip the bearing upon the top of the jack-post, so that the bearing presses equally upon the wood of the last. With a spherical joint between the bearing and the post the bearing may be held from turning laterally by a dowel $j$, fitted to a hole $k$ in the bearing-block; but when a cylindrical joint is employed, as shown in Fig. 6, the block does not require any dowel, as the engagement of the cylindrical seat $e$ and socket $d$ suffices. Such cylindrical bearing permits the block to tip only fore and aft; but this is the direction in which the displacement of the last is most common in the operation of heeling.

In Fig. 8 a cylindrical bearing acting merely as a rocker and not as a hinged joint is shown, with the parts arranged in an inverse manner from those shown in the previous figures, the convex seat being shown upon the head of the post and the under side of the bearing-block being made flat to rock upon the same. With this construction the block is liable to turn laterally, and a dowel j is therefore provided, as with the spherical joint. The constructions shown in Figs. 1 and 6 may also be inverted, as the essential part of my invention is the interposition of a loose self-adjusting bearing-block between the top of the jack-post and the head of the last.

It is obvious that in heeling shoes by hand the pressure is liable to be applied unequally upon the edges of the heel, and where the head of the last rests upon a solid jack-post the last in contact with the post is liable to be indented by such irregular pressure. My improvements are therefore equally adapted for use under such circumstances. By the use of a loose bearing-block between the top of the jack-post and the head of the last the block may be instantly changed for another to suit a last of any particular size, and the full bearing may thus be secured upon the wood of the last to resist the pressure applied in the heeling operation.

My construction thus furnishes the means of applying a series of different bearing-blocks readily to the pin upon the jack, and such a series is shown in Figs. 5, 9, and 10, embracing three diverse bearing-blocks of different lengths adapted for use with lasts of various sizes, the bearing-block in Fig. 9 being adapted to fit the head of a larger last than is shown in Fig. 1 and the bearing-block shown in Fig. 10 being adapted for a smaller last. Any number and variety of bearing-blocks may be applied to the same post, and thus adapt the jack for use with every variety of last.

My improvements in the jack may be used at any stage in the manufacture of boots and shoes to which it is adapted, as well as in the heeling operation.

Having thus set forth the nature of my invention, what I claim herein is—

1. In a jack for heeling shoes, the combination, with the post a, of the guide-pin f, fixed rigidly in and projected from the top of the post, and the yielding bearing-block c, fitted to rock upon the head of the post and provided with the hole g of greater diameter than the pin, as and for the purpose set forth.

2. In a jack for heeling shoes, the combination, with the post a, of the yielding bearing-block c, having the hole g, fitted to rock upon the head of the post, and the guide-pin f, provided with the shoulder h to engage the edge of the hole g when the bearing-block is tipped, as and for the purpose set forth.

In testimony whereof I have hereunto set my hand in the presence of two subscribing witnesses.

DANIEL WHITLOCK.

Witnesses:
L. LEE,
THOS. S. CRANE.